United States Patent [19]

Hofer

[11] E Re. 30,616

[45] Reissued May 19, 1981

[54] BOX FOR AMPOULES HAVING A PACKAGING INSERT THAT PROVIDES A CLOSURE ARRANGEMENT AND REINFORCEMENT

[75] Inventor: Otto Hofer, Schaan, Liechtenstein

[73] Assignee: Interondo AG, Buchs, Switzerland

[21] Appl. No.: 149,531

[22] Filed: May 13, 1980

Related U.S. Patent Documents

Reissue of:

[64] Patent No.: 4,186,835
Issued: Feb. 5, 1980
Appl. No.: 950,179
Filed: Oct. 10, 1978

[30] Foreign Application Priority Data

May 26, 1978 [CH] Switzerland ..... 5771/78

[51] Int. Cl.[3] ..... B65D 5/54; B65D 83/04

[52] U.S. Cl. ..... 206/443; 206/532; 206/539; 206/626

[58] Field of Search ..... 206/443, 528, 532, 538–539, 206/621, 626; 229/43, 44 R

[56] References Cited

U.S. PATENT DOCUMENTS

| | | | |
|---|---|---|---|
| 1,980,851 | 11/1934 | Crawford | 206/626 |
| 3,263,899 | 8/1966 | Collura et al. | 206/626 X |
| 3,270,946 | 9/1966 | Redpath et al. | 206/626 X |
| 3,366,310 | 1/1968 | Simpson et al. | 206/626 X |
| 3,921,895 | 11/1975 | Ziche | 206/528 X |

*Primary Examiner*—William T. Dixson, Jr.
*Attorney, Agent, or Firm*—Edward J. Brenner

[57] ABSTRACT

A box for ampoules has a front wall with a top edge well below the top edge of the rear wall so as to define (with side walls) an opening closed by a cover extending from the rear wall and overlapping the front wall to which it is secured by an adhesive edge. Lines of perforations across the overlapping portion define a web to be torn off when access is to be had to the ampoules. This leaves the remaining part of the cover with a tongue which, when the box is again to be closed, is tucked into a pocket between the front wall and a support for the ampoules which also strengthens the front wall. The support includes corrugated cardboard providing compartments for the ampoules. The tongue and top edge of the front wall are shaped to interlock.

5 Claims, 3 Drawing Figures

BOX FOR AMPOULES HAVING A PACKAGING INSERT THAT PROVIDES A CLOSURE ARRANGEMENT AND REINFORCEMENT

Matter enclosed in heavy brackets [ ] appears in the original patent but forms no part of this reissue specification; matter printed in italics indicates the additions made by reissue.

FIELD OF THE INVENTION

This invention relates to a box for packaging elongate articles, in particular ampoules, comprising a box body which is formed by folding and glueing operations, having a rear wall and side walls adjoining the rear wall and having a front wall which has an opening which in the closed condition is closed by a cover, and having a packaging insert comprising a corrugated cardboard strip which is adhered to a support.

When the contents of a packaging box are ampoules, it is particularly important that the individual ampoules are firmly held by the packaging insert but that on the other hand the ampoules can be easily removed at any time. As the entire content of the packaging box is generally not consumed at the same time, the box must be re-closable after it has been torn open for the first time.

DESCRIPTION OF THE PRIOR ART

Ampoule packages of this kind are already known in different forms. Thus for example Swiss Patent Specification No. 281,928 describes a box with a trough-like packaging insert. This box has an open front, which suffers from the disadvantage that, if the box is handled carelessly after the cover has been opened, the ampoules can fall out. German Gebrauchsmuster No. 1,908,577 discloses a package with an insert and which has an opening at its front side. Both inventions suffer from the common disadvantage that the front of the box is relatively unstable and that the cover for re-closing the box must be inserted at the bottom thereof. This means that the cover with the insertion tongue portion must be particularly long, which results in the consumption of a corresponding amount of material. In addition, an additional slot for inserting the cover tongue portion must be cut at the bottom of the box, and this results in additional weakening. This can easily result in deformation of the box, once the box has been torn open, when the box is subjected to a mechanical loading, for example when it is being carried, so that the contents of the box can suffer damage.

SUMMARY OF THE INVENTION

It is therefore the problem of the present invention to overcome the disadvantages of the known box and in particular to provide an ampoule box which is also stable at its front and which can be re-closed again in a particularly simple manner, once it has been torn open. According to the invention, this is primarily achieved in that the support of the packaging insert is arranged in the box body lying against the inside of the front wall, for the purposes of strengthening the front wall. In accordance with another feature of the invention, the support together with the inside of the front wall forms a pocket for insertion of the cover.

It will be seen that this arrangement solves equally two problems. By virtue of the opening at the front wall of the box, the box is relatively unstable at that point. Additional stiffening of this part is achieved by the arrangement of the packaging insert, in accordance with the invention. The pocket which is thus formed between the front wall and the support serves in a particularly simple manner for insertion of the cover, after the package has first been opened. Thus, the additional operation of cutting a slot for receiving the tongue portion can be completely omitted.

In order to prevent the packaging insert from slipping out of the box, the support of the packaging insert is glued to the inside of the front wall at least along the boundary edges which are directed towards the side walls. The stability of the box is even further increased by such glueing. The invention may be embodied in a particularly simple manner if the upper boundary edge of the packaging insert coincides with the lower boundary edge of the opening. In this case, the packaging insert performs its function according to the invention, without masking the view of the ampoules. In particular, according to the invention it is possible for the boxes to be provided with relatively deep openings, which provides for easier access to the ampoules, without detrimentally affecting the stability of the box. In some uses however, in accordance with a further embodiment of the invention, it is also possible for the support of the packaging insert to cover a part of the opening at the front wall of the box.

DESCRIPTION OF THE DRAWINGS

An embodiment of the invention is described hereinafter and is illustrated in the drawings, in which:

As shown in FIG. 1, the box body 1 comprises an originally flat cardboard member which is fitted together to form a compact box by machine processing, by means of folding and glueing operations. The box body has a rear wall 2 to which side walls 3 are directly secured. Also formed on the rear wall 2 is a bottom wall 16 to which a front wall 4 is secured. The side walls 3 are provided with adhesive fold portions 3' which are glued to the front wall 4 and at the same time form a part thereof. The front wall 4 is not extended upwardly over the entire height of the rear wall 2, so that at the front the box has an opening 5. This opening facilitates removal of the ampoules from the box. A cover 6 which is connected to the bottom 2 covers the entire front side of the box, in the closed condition. In the closed condition, the box is firmly closed by the cover 6 being stuck at an adhesive edge 8 on to the front wall 4. For the purposes of opening the box, a tear-off web portion 9 which is formed by perforated lines 17 in the cover 6 must be torn out. The perforated lines 17 are so arranged that a cover tongue portion 10 remains on the cover 6 after the tear-off web portion 9 has been torn off. The web portion 9 not only provides for rapid and tidy opening of the box, but fulfils a security function, by also ensuring that the packaging is intact so long as it is not torn away. Any unauthorised opening of the box, or even only an attempt to open the box without authorisation, is indicated by the perforations 17 at the tear-off web portion 9 being torn. For the purposes of improved closing of the box, the side walls 3 are provided at both sides with lateral tongue portions 7 which, when the box is closed, bear against a portion 6a of the cover 6 that constitutes the top of the box. A per se known packaging insert 12, as shown in FIG. 2, is used for holding the ampoules in the interior of the box. The packaging insert substantially comprises a corrugated cardboard strip 13 which is secured by adhesive to a support 14. The thickness of the material of the support 14 is approximately the same as that of the box body 1. As shown in FIG. 1, the packaging insert 12 is inserted into the box in such a way that the support 14 lies against the inside of the front wall 4. This provides for strengthening of the box, as the box in itself is relatively unstable, by virtue of the opening 5 at its front. The front wall 4 and the support 14 of the packaging insert 12 together form a pocket 15 for insertion of a cover tongue portion 10, after the tear-off web portion 9 has been torn off. In order to facilitate insertion of the cover tongue portion 10, a tongue portion opening 11 is cut out on the front wall 4. It will be seen that the configuration of the opening 11 and the tongue portion 10 are formed so as to interlock in order to enable the cover 6 to be secured in a satisfactory manner. It would also be possible for example for the front wall 4 to be provided only with a slot for insertion of the cover tongue portion 10. In order to prevent the packaging insert 12 from falling out of the box, the packaging insert 12 is advantageously glued to the inside of the front wall 4, at least at the boundary edges of the support 14 close to the side walls 3 or to the bottom wall 16.

FIG. 3 shows an ampoule box according to the invention, with the cover tongue portion 10 inserted, after the tear-off web portion 9 has been torn off. After the web portion has been torn off, the adhesive edge 8 remains visible on the front wall 4 of the box. The adhesive fold portions 3' of the side walls 3 are also partly visible. The cover tongue portion 10 is fully inserted into the pocket 5 and is therefore not directly visible. The tongue portion opening 11 is also covered by the cover 6, in the closed condition of the box. The box can be satisfactorily reclosed again at any time in this manner, until the entire contents of the box have been consumed. It will be seen that it does not matter whether the width of the support 14 corresponds to the width of the front wall 4. For some uses, it is also possible for the support 14 to mask a part of the opening 5 at the front wall.

Figure 1:
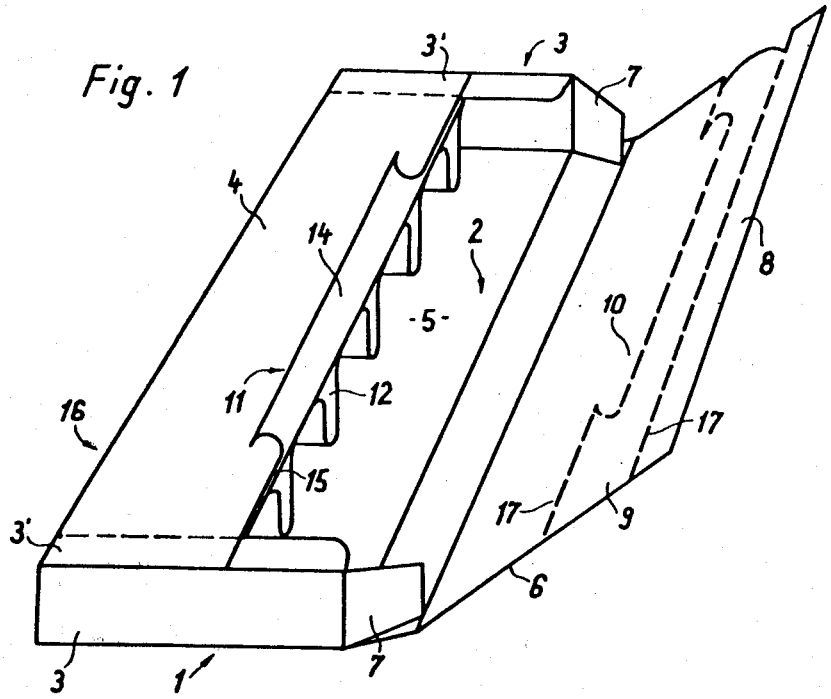
FIG. 1 is a perspective view on to an ampoule box according to the invention, with the cover open.
Figure 2:
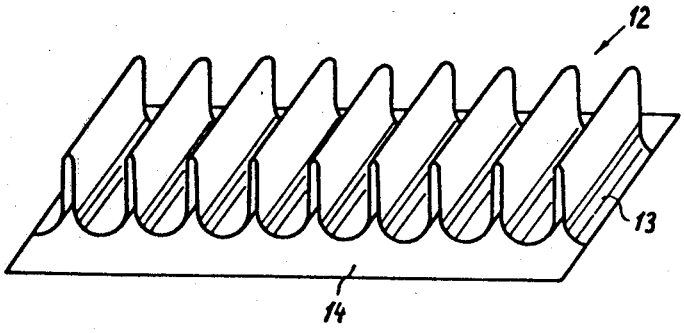
FIG. 2 is a perspective view of a per se known corrugated packaging insert.
Figure 3:
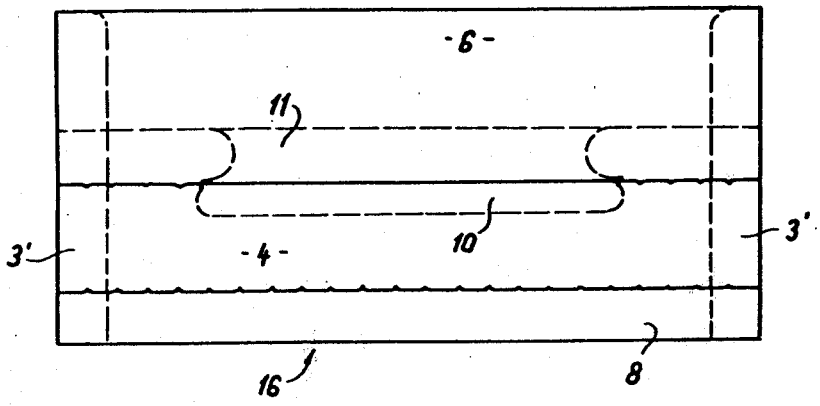
FIG. 3 shows a plan view on to a re-closed ampoule package.

It will be appreciated that the use of the words 'rear', 'front', and 'side' in this specification is merely for convenience in describing the relative position of the walls. The box as a whole can be located in any convenient position.

I claim:

1. A box for packaging elongate articles, such as ampoules, comprising a box body formed by folding and gluing operations and including a rear wall having two side edges, a bottom edge and a top edge, two side walls respectively extending forward from said side edges of said rear wall and having parallel front edges, a front wall extending between said front edges of said side walls, said front wall being of less area than said rear wall, thereby forming with said side walls an open area, a cover extending from said top edge of said rear wall and formed to cover said open area, means for detachably securing said cover to said front wall, and an insert for packaging the elongated articles and including firstly a support formed and secured to lie against the inside surface of said front wall for the purpose of strengthening said front wall and secondly a corrugated cardboard strip adhered to said support for receiving the elongated articles respectively in corrugations thereof, said front wall and said support being formed to provide a pocket open toward the top of the box, said means for detachably securing said cover to said front wall comprising a tongue portion formed on said cover for insertion into said pocket.

2. A box according to claim 1, in which said support is glued to the inside surface of said front wall at locations thereof outside said pocket.

3. A box according to claim 1, in which the top of said packaging insert substantially coincides with the bottom edge of said opening.

4. A box for packaging elongated articles, such as ampoules, comprising a box body formed by folding and gluing operations and including a rear wall having two side edges, a bottom edge and a top edge, two side walls respectively extending forward from said side edges of said rear wall and having parallel front edges, a front wall extending between said front edges of said side walls, said front wall being of less area than said rear wall and having a bottom edge level with said bottom edge of said rear wall and a top edge considerably below said top edge of said rear wall, thereby forming with said side walls an open area, and a cover extending from said top edge of said rear wall and formed to extend over said open area and present a portion overlapping said front wall, said overlapping portion of said cover having side edges and an adhesive bottom edge and spaced perforated lines extending between said side edges of said overlapping portion to define a tear-off web portion which on being torn-off from said overlapping portion when said adhesive bottom edge is adhered to said front wall, enables said box body to be opened, and an insert for packaging the elongate articles and including firstly a support formed and secured to lie against the inside surface of said front wall and secondly a corrugated cardboard strip adhered to said support for receiving the elongated articles respectively in corrugations thereof, said front wall and said support being formed to provide a pocket open toward the top of the box, the one of said perforated lines nearest the top of the box being shaped so that, when said tear-off web portion is torn-off said overlapping portion, a remaining part of said cover joined to said back wall has a tongue portion for insertion into said pocket.

5. A box according to claim 4, in which said top edge of said front wall is formed with a recess, said recess and said tongue being shaped to provide an interlocking relationship to secure said cover closed over said opening.

* * * * *